(12) United States Patent
Wagenaar et al.

(10) Patent No.: US 10,560,726 B2
(45) Date of Patent: Feb. 11, 2020

(54) SYSTEM AND METHOD FOR DELIVERY AND CACHING OF PERSONALIZED MEDIA STREAMING CONTENT

(71) Applicant: CODESHOP BV, Amsterdam (NL)

(72) Inventors: Arjen Wagenaar, Amsterdam (NL); Mark Ogle, Amsterdam (NL); Dirk Griffioen, Arnhem (NL); Rufael Mekuria, Amsterdam (NL)

( * ) Notice: Subject to any disclaimer, the term of this patent is extended or adjusted under 35 U.S.C. 154(b) by 0 days.

(21) Appl. No.: 16/044,840

(22) Filed: Jul. 25, 2018

(65) Prior Publication Data

US 2019/0037252 A1      Jan. 31, 2019

Related U.S. Application Data

(60) Provisional application No. 62/537,227, filed on Jul. 26, 2017.

(51) Int. Cl.
*H04N 7/173* (2011.01)
*H04N 21/231* (2011.01)
(Continued)

(52) U.S. Cl.
CPC ... *H04N 21/23106* (2013.01); *H04L 65/4084* (2013.01); *H04L 65/602* (2013.01);
(Continued)

(58) Field of Classification Search
None
See application file for complete search history.

(56) References Cited

U.S. PATENT DOCUMENTS

| 7,457,915 B2 | 11/2008 | Getzinger et al. |
| 7,496,678 B2 | 2/2009 | Roth et al. |

(Continued)

FOREIGN PATENT DOCUMENTS

| EP | 1376299 A3 | 8/2007 |
| EP | 2409475 A2 | 7/2017 |

OTHER PUBLICATIONS

ISO/IEC JCT1/SC29 MPEG, "ISO/IEC 23009-1:2014: Dynamic adaptive streaming over HTTP (DASH)—Part 1: Media presentation description and segment formats," 2014.

(Continued)

*Primary Examiner* — William J Kim
(74) *Attorney, Agent, or Firm* — Marc Boillot

(57) ABSTRACT

A system and method for delivery and caching of media presentations is provided. The system includes client, a video origin server, a manifest generator, a video URL resolver, one or more original, inserted or edited media contents, and one or more personalized manifest files. The video origin server generates personalized media segments based on original, inserted or edited content for delivery to the client, possibly using MPEG-4 metadata. The video URL resolver resolves the encoded URLs that adhere to a structure of a source and output descriptor based on the one or more personalized media segments. The manifest generator then produces the one or more personalized manifest files containing the one or more encoded URLs A compositor converts the one or more encoded URLs adhering to the structure of source and output descriptor to the one or more personalized segments. Other embodiments are disclosed.

20 Claims, 11 Drawing Sheets

(51) Int. Cl.

| | | |
|---|---|---|
| *H04N 21/258* | (2011.01) | |
| *H04L 29/06* | (2006.01) | |
| *H04N 21/234* | (2011.01) | |
| *H04N 21/236* | (2011.01) | |
| *H04N 21/2668* | (2011.01) | |
| *H04N 21/845* | (2011.01) | |
| *H04L 29/08* | (2006.01) | |
| *H04N 21/858* | (2011.01) | |

(52) U.S. Cl.
CPC ............ *H04L 65/608* (2013.01); *H04L 67/02* (2013.01); *H04N 21/236* (2013.01); *H04N 21/23412* (2013.01); *H04N 21/25808* (2013.01); *H04N 21/2668* (2013.01); *H04N 21/8456* (2013.01); *H04N 21/8586* (2013.01)

(56) References Cited

U.S. PATENT DOCUMENTS

| | | | |
|---|---|---|---|
| 7,941,554 B2 | 5/2011 | Alexandre et al. | |
| 8,171,167 B2 | 5/2012 | Leveque et al. | |
| 8,492,250 B2 | 7/2013 | Ko | |
| 8,495,675 B1 | 7/2013 | Philpott et al. | |
| 8,510,785 B2 | 8/2013 | McKinley et al. | |
| 8,977,704 B2 | 3/2015 | Liu et al. | |
| 9,124,650 B2 | 9/2015 | Maharajh | |
| 2003/0236906 A1* | 12/2003 | Klemets | H04N 5/76 709/231 |
| 2004/0111677 A1* | 6/2004 | Luken | H04N 21/85406 715/234 |
| 2006/0036571 A1* | 2/2006 | Fukushima | G06F 16/40 |
| 2006/0139379 A1* | 6/2006 | Toma | G06T 3/40 345/698 |
| 2010/0235528 A1* | 9/2010 | Bocharov | H04N 21/6437 709/231 |
| 2011/0093900 A1* | 4/2011 | Patel | H04N 7/17318 725/54 |
| 2011/0225417 A1* | 9/2011 | Maharajh | G06F 21/10 713/150 |
| 2014/0280515 A1* | 9/2014 | Wei | H04L 67/02 709/203 |
| 2015/0222681 A1 | 8/2015 | Basile et al. | |
| 2015/0382042 A1* | 12/2015 | Wagenaar | H04N 21/26258 725/34 |
| 2016/0182582 A1* | 6/2016 | Wagenaar | H04L 65/4069 709/231 |
| 2016/0234144 A1* | 8/2016 | Hannuksela | H04L 51/063 |
| 2017/0034301 A1 | 2/2017 | Adderly et al. | |
| 2017/0187821 A1 | 6/2017 | Yevmenkin et al. | |

OTHER PUBLICATIONS

Apple. (Mar. 2016) HTTP Live Streaming. [Online]. https://developer.apple.com/streaming/.
IETF. RFC 2626 Hypertext Transfer Protocol—HTTP/1.1. [Online]. https://tools.ietf.org/html/rfc2616.
adblock plus. adblock plus. [Online]. https://adblockplus.org/.
Federal INformation Processing Standards, "Specification for the advanced encryption standard (AES)," NIST, 48051-48058, 2001.
Society of Cable and Telecommunication Engineers, "Digital Program Insertion Cueing Message for Cable ," 35, 2016.
HTTP Live Streaming https://tools.ietf.org/html/rfc8216.
ISO/IEC JTC1 SC29 WG11, "Information technology—Coding of audio-visual objects—Part 10: Advanced Video Coding," ISO/IEC 14496-10:2014, 2014.
ISO/IEC JTC1 SC29 WG11, "Information technology—Generic coding of moving pictures and associated audio information: Systems," ISO/IEC 13818-1:2007, 2007.
Microsoft. Smooth Streaming Transport Protocol. [Online], https://www.iis.net/learn/media/smooth-streaming/smooth-streaming-transport-protocol.
ISO/IEC JTC 1/SC 29, "Information technology—Coding of audio-visual objects—Part 12: ISO base media file format," ISO/IEC 14496-12:2012 , 2016.
IEC/ISO, "Information technology—High efficiency coding and media delivery in heterogeneous environments—Part 2: High efficiency video coding," ISO/IEC 23008-2:2015, 2015.
Advanced Encryption Standard, Federal Information Processing Standards Publication 197, FIPS-197, http://www.nist.gov/.
ISO/IEC. ISO/IEC 23001-7:2015, Information technology—MPEG systems technologies—Part 7: Common encryption in ISO Base Media File Format files—2nd Edition. International Standard. URL: https://www.iso.org/obp/ui/#iso:std:iso-iec:23001:-7:ed-2:v1.

\* cited by examiner

100

200

HTTP Live Streaming Format Manifest

```
<?xml version="1.0" encoding="utf-8"?><!-- Created with Unified Streaming
Platform(version=1.7.31) --><MPD xmlns:xsi="http://www.w3.org/2001/XMLSchema-instance"
xmlns="urn:mpeg:dash:schema:mpd:2011"
xsi:schemaLocation="urn:mpeg:dash:schema:mpd:2011
http://standards.iso.org/ittf/PubliclyAvailableStandards/MPEG-DASH_schema_files/DASH-
MPD.xsd" type="static" mediaPresentationDuration="PT40.533333S"
maxSegmentDuration="PT4S" minBufferTime="PT10S" profiles="urn:dvb:dash:profile:dvb-
dash:2014,urn:dvb:dash:profile:dvb-dash:isoff-ext-live:2014"> <Period id="1"
duration="PT40.533333S"> <BaseURL>dash/</BaseURL> <AdaptationSet    group="2"
contentType="video"   par="16:9"    minBandwidth="527"    maxBandwidth="1500"
maxWidth="711"    maxHeight="400"    segmentAlignment="true"   mimeType="video/mp4"
startWithSAP="1"> <Role    schemeIdUri="urn:mpeg:dash:role:2011"    value="main">
</Role>  <SegmentTemplate    timescale="1000"    initialization="Miw1LA=-
$RepresentationID$.dash"    media="Miw1LA=-$RepresentationID$-$Time$.dash">
<SegmentTimeline>   <S t="0" d="3840" r="4" />    <S d="1066" />    <S d="3840"
r="4" />    <S d="1000" />    </SegmentTimeline>    </SegmentTemplate>
<Representation    id="video=527"    bandwidth="527"    width="336"    height="192"
sar="64:63"    codecs="avc3.42C014"    scanType="progressive"> </Representation>
</AdaptationSet> </Period></MPD>
```

MPEG Adaptive Streaming Format Manifest

EXTM3U#EXT-X-VERSION:4## Created with Unified Streaming Platform(version=1.7.31)# AUDIO groups#EXT-X-MEDIA:TYPE=AUDIO,GROUP-ID="audio-aacl-0",NAME="audio",AUTOSELECT=YES,DEFAULT=YES,CHANNELS="2",URI="Miw1LA==-audio=128.m3u8"# variants#EXT-X-STREAM-INF:BANDWIDTH=1000,CODECS="mp4a.40.2,avc1.42C014",RESOLUTION=341x192,AUDIO="audio-aacl-0",CLOSED-CAPTIONS=NONEMiw1LA==-video=527.m3u8#EXT-X-STREAM-INF:BANDWIDTH=2000,CODECS="mp4a.40.2,avc1.42C01E",RESOLUTION=711x400,AUDIO="audio-aacl-0",CLOSED-CAPTIONS=NONEMiw1LA==-video=1500.m3u8# keyframes#EXT-X-I-FRAME-STREAM-INF:BANDWIDTH=1000,CODECS="avc1.42C014",RESOLUTION=341x192,URI="keyframes/Miw1LA==-video=527.m3u8"#EXT-X-I-FRAME-STREAM-INF:BANDWIDTH=1000,CODECS="avc1.42C015",RESOLUTION=512x288,URI="keyframes/Miw1LA==-video=890.m3u8"#EXT-X-I-FRAME-STREAM-INF:BANDWIDTH=1000,CODECS="avc1.42C01E",RESOLUTION=711x400,URI="keyframes/Miw1LA==-video=1500.m3u8"

"ftyp" 703
"moov" 704
"trak" 705
"mdia" 706
"hdlr" -> handler_type 707
"mdhd" -> timescale 708
"minf" 709
"stsd" -> fourcc 710
"sinf" -> encryption 711
"frma" 712
"schm" 713
"schi" -> TrackEncryptionBox 714
("tenc") 715
"moof" 716
"mfhd" -> sequence number 717
"traf" 718
"tfhd" 719
"tfdt" -> base media decode time 720

```
"ftyp" 751
"moof" 752
"mfhd" -> sequence number 753
"traf" 754
"tfhd" 755
"tfdt" 756
(base media decode time of the first sample in the media)
"tfxd" -> optional truncation window 757
"tfrf" 758
"meta" 759
"hdlr" 760
"dinf" 761
"dref" -> http://www.example.com/video.mp4 762
"iloc" 763
    item_count = 2 764
    construction_method = 0 764
    data_reference_index = 1 765
    extent_count = 1 766
    extent_offset = 0, extent_length=3214 767
    construction_method = 0 768
```

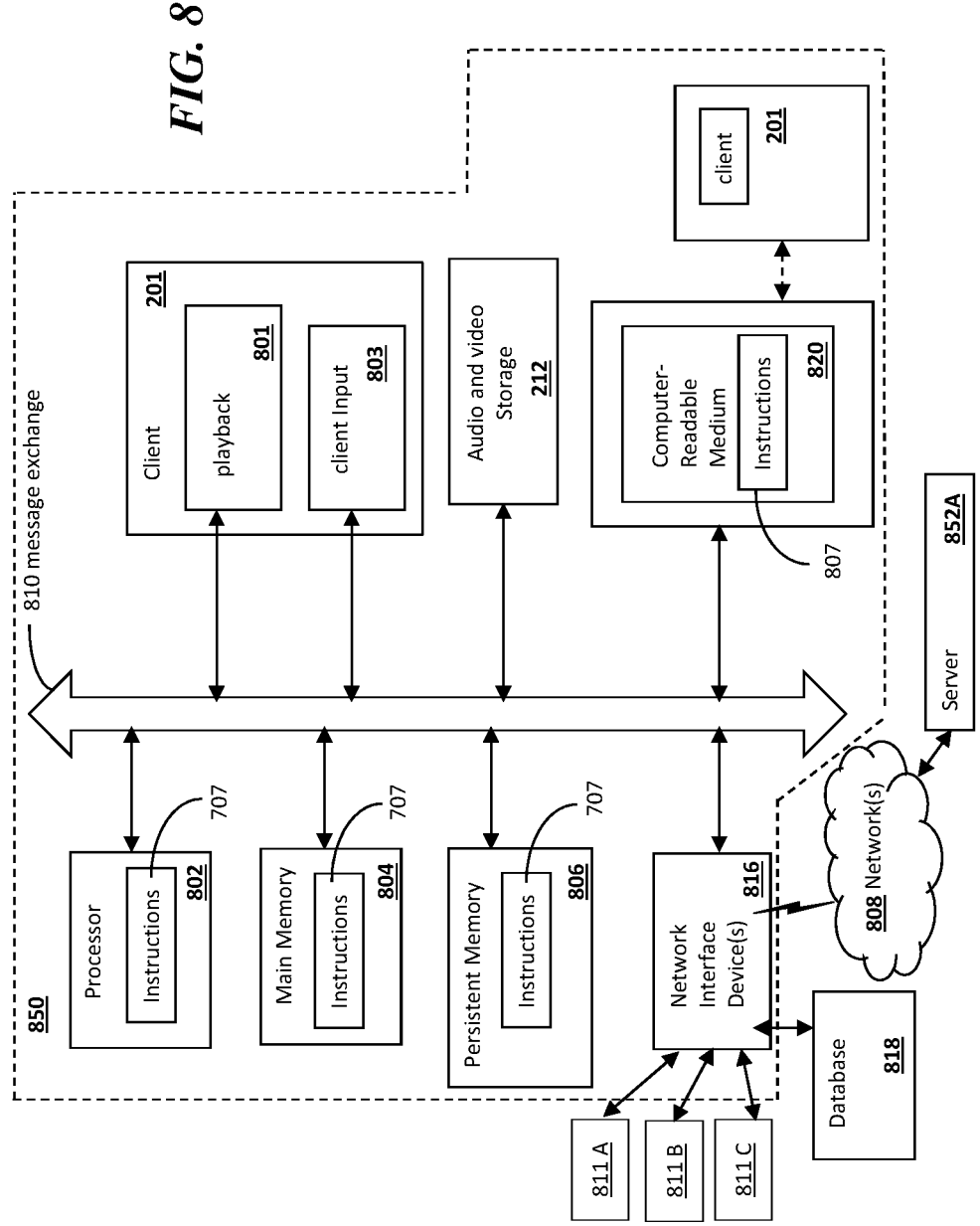

SYSTEM AND METHOD FOR DELIVERY AND CACHING OF PERSONALIZED MEDIA STREAMING CONTENT

CROSS REFERENCE TO RELATED APPLICATION

This application claims the priority benefit of U.S. Provisional Patent Application No. 62/537,227 entitled System and Method for Delivery and Caching of Personalized Media Streaming Content, filed Jul. 26, 2017, by the same inventors, the entire contents of which are hereby incorporated by reference.

FIELD

The present invention relates to Internet streaming of media, and in particular embodiments to caching and requesting converted adaptive bit-rate streams such as those with inserted, edited content or other converted content.

BACKGROUND

Media services such as Internet video streaming are becoming increasingly popular. Typical Internet video streaming uses streaming protocols such as MPEG DASH or HTTP Live Streaming HLS that use the Hyper Text Transfer Protocol (HTTP) as the primary transport protocol. With more devices and formats becoming available, media is often converted to a personalized format before being delivered to a client. Contrary to traditional broadcasting, advertisements or formats can be fully personalized as contrary to TV broadcasting, each user receives data through their own Internet connection. This makes insertion or conversion of content in Internet video presentations for advertisement attractive and a large potential source of revenue. Example of conversion could be insertion, editing or re-encoding of content for personalization and or monetization. This is usually done to comply with user and or device needs for a media streaming presentation.

The Media industry uses many different formats such as those defined by the Moving Picture Experts Group (MPEG) and proprietary ones defined by companies such as Apple®, Microsoft® and Adobe®. Delivery of converted content to is useful for fitting content to different screen sizes and types, complying to protocol needs and/or matching user preferences.

The Unified Remix Solution and Unified Origin developed and sold by the Unified Streaming Platform, are examples of state of the art system convert media from one format to another format. For example the Unified Origin can be used to convert a media file into a streaming presentation such as based on protocols such as MPEG DASH, HTTP Live Streaming HLS. The Unified Remix solution is current state of the art for streaming of personalized and edited media content. This solution can create a remixed MPEG-4 meta-data file that references different media sources. This MPEG-4 meta-data file can then be used for streaming the content using Unified Origin.

Nevertheless, as different segments exist in the streaming manifest files the caching in the content delivery remains a problem. This is a large problem as content delivery networks typically use the URL as a cache key for storing content. Caching networks such as CDN's typically cache based on the name and location of the content item specified by the uniform resource locator string URL. For highly personalized playlists each of the segments will have different URL. From the outset of this text it is assumed that URL refers to a string locating or identifying a resource such as Uniform Resource Locator URL or Uniform Resource Indicator URI as defined in respective request for comments documents published by the Internet Engineering Task Force (IETF). The Unique URLs in personalized media presentations make delivering and caching this type of content challenging. This has triggered active academic and industry research.

The absence of a solution to this problem makes it very difficult to deploy cost efficient highly personalized video streaming using content delivery networks, hindering monetization of content in the best possible way. This problem also applies to converted content, including watermarked streams, personalized streams and many other type of personalized streams. An example of a recent research in this area was presented He et al. ACM MMSys 2018 in the paper entitled Watermarked Video Delivery: Traffic Reduction and CDN Management.

More and more converted and derived media is becoming available for delivery, caching and storing. Caching and delivering such content efficiently is becoming an increasingly important problem for the industry. Several research works addressed caching which is e.g. Y Jin et al Transactions on circuits and systems for video technology 2015, C. Liu patent application U.S. Pat. No. 8,977,704B2.

SUMMARY

In one embodiment, a system for delivery and caching of media presentations is disclosed. The system comprises a client, a video origin server, a manifest generator, and a video URL resolver for delivering one or more original, inserted or edited media contents described in one or more personalized manifest files. The contents are referenced using one or more encoded URLs that adhere to the structure of a source and a output descriptor related to the generation of the one or more personalized media segments. This enables more efficient delivery via a Content Delivery Network. The system can further include a compositor linked between the CDN and the video origin server to convert the one or more encoded URLs adhering to the structure of source and output descriptor 244 to the one or more personalized media segments.

In another embodiment, a method for delivering and caching media presentations with inserted or edited media content is provided. The method includes the steps of optionally generating a MPEG-4 meta-data file 213 that references the original, inserted or edited media content, generating one or more personalized media segments based on the original, inserted or edited media content, generating one or more encoded URLs adhering to the structure of source and output descriptor 244, generating one or more streaming manifests including the one or more encoded URLs adhering to the structure of source and output descriptors, caching of content based on the one or more encoded URL's adhering to the structure of source and output descriptor, requesting the one or more personalized media segments using the one or more coded URL's adhering to the structure of input and output descriptor 244, and delivering the one or more personalized media segments following a request using the one or more coded URL's adhering to the structure of input and output descriptor.

The one or more personalized segments can be converted from the original, inserted or edited media content 212 using the remixed MPEG-4 meta-data, where the encoded URLs adhering to the structure of source and output descriptors are generated based on the remixed MPEG-4 meta-data and the original, edited and inserted content and an output descriptor. The delivery of the one or more personalized media segments can occur subsequent HTTP requests using the encoded URLs adhering to the structure of source and output descriptors. Further steps include receiving and playing the one or more streaming manifests and the one or more personalized media segments at a client, and segment caching using a cache key based on the one or more encoded URLs adhering to the structure of source and output descriptors, using a source descriptor and an output descriptor composed based on ISO Base media file format data boxes. The method can further include resolving encoded URLs that adhere to the structure of source and output descriptor back to the personalized media segments.

BRIEF DESCRIPTION OF THE DRAWINGS

For a more complete understanding of this disclosure, reference is now made to the following brief description, taken in connection with the accompanying drawings and detailed description, wherein like reference numerals represent like parts. The presented figures illustrate one or more embodiments.

FIG. 5A illustrates an example of one or more manifests containing personalized content, in this case, based on the MPEG DASH and HTTP Live Streaming HLS formats;

FIG. 5B also illustrates an example of the one or more manifests containing personalized content, in this case, based on the MPEG DASH and HTTP Live Streaming HLS formats;

FIG. 7A illustrates a structure of the source and output descriptors that are typically composed of ISO Base Media File format illustrating the containing atoms and boxes to build this representation;

FIG. 7B also illustrates a structure of the source and output descriptors that are typically composed of ISO Base Media File format illustrating the containing atoms and boxes to build this representation; and FIG. 8 illustrates a computing architecture to enable an exemplary embodiment, comprising a main memory, processor and a network interface.

SPECIFICATION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Media streaming in the Internet often uses video content coded at different bit-rates and delivered using different streaming protocols such as MPEG DASH® or HTTP Live Streaming HLS® that enable streaming of a media presentation. A key advantage of these protocols is that they can re-use the caching infrastructure provided by Content Delivery Network used for serving online webpages.

Altogether, the nature of the clients and the lack of control over their implementations makes the editing and insertion of content in media streaming presentations a difficult problem. Such presentations often require server-side conversion of the content to achieve a coherent presentation that can be played back by the client. With more compute capabilities becoming available in the cloud such as the public cloud deployed by Microsoft Azure®, Google Cloud®, Amazon AWS® and Alibaba® or in virtualized network such as those based on Network Function Virtualization®. Such compute functionality can be used to convert media formats such as using transcoding, content stitching and so on.

It provides users an opportunity for personalized and more targeted video streaming, yet due to the different URL's generated caching in content delivery networks will not be efficient in terms of caching and delivery. This invention teaches a system and method for caching and delivery of such highly personalized converted media content. One useful application of these formats is in the emerging MPEG NBMP standard which supports on-the-fly conversion of contents. Embodiments of this invention are not limited to this use case, the segments in the presentation can be used for any types of converted media based on an input source and output source that contains the meta-data such as in the ISOBMMF moov box.

Figure 1:
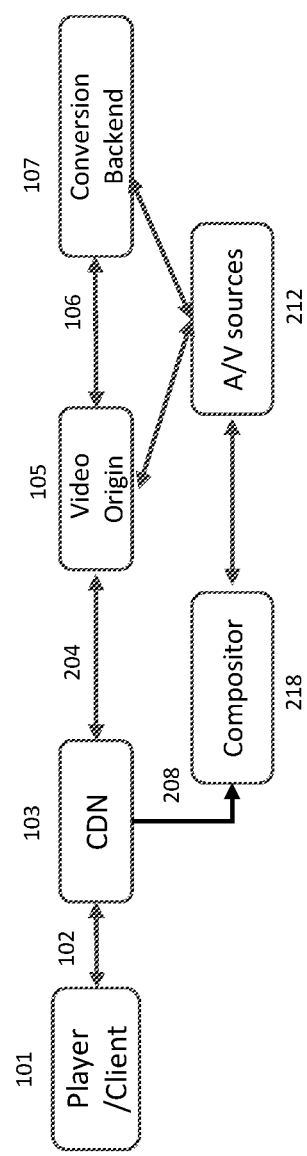
FIG. 1 illustrates a base system with unique components for streaming with converted, inserted and edited content in accordance with one embodiment.

FIG. 1 illustrates an embodiment of a personalized streaming system for delivering, to a client 101, media presentations with edited or inserted content 102, 204. The Remix conversion backend 107 provides a stitching backend, and can provide remixed MPEG-4 meta-data 106 that can be based on, for example, the ISOBMFF format. The system 100 comprises, at the least, a video origin server 105 connected to the client 101, which can be any device suitable of playing and receiving a media streaming presentation. The system 100 can provide media delivery through a content delivery network CDN 103. To support personalized links, a compositor 218 component is included to resolve encoded URLS adhering to the structure of source and an output descriptor. The compositor 218 is introduced in FIG. 1 and discussed further in detail in the FIG. 2 along with other components for explaining the functionality of the system 100.

Figure 2A:
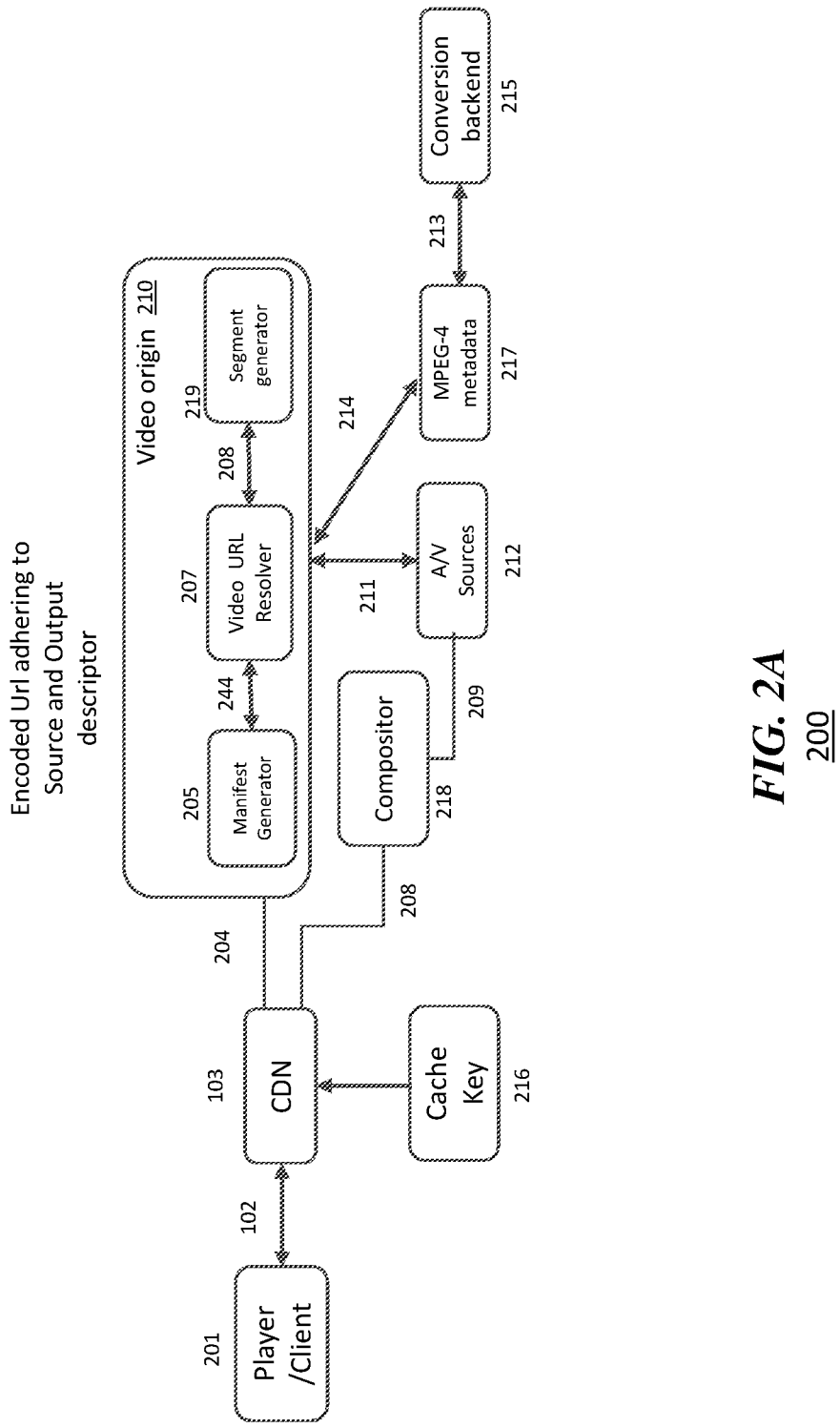
FIG. 2A illustrates an expanded system with both server and client side components for streaming with inserted and edited and original content.

FIG. 2A illustrates a system 200 for delivery and caching of media presentations. The system 200 comprises a client 201, a video origin server 210, a manifest generator 205, and a video URL resolver 207 for delivering one or more original, inserted or edited media contents 212 described in one or more personalized manifest files 204, and optionally including, a segment generator 219 to produce segments. The content delivery network delivers the one or more personalized media segments 208,209 to the client 201 responding to an HTTP request for content based on the one or more encoded URLs adhering to structure of source and output descriptor 244. The content is referenced using one or more encoded URLs that adhere to a structure of source and an output descriptor 244 related to the generation of the one or more personalized media segments 208 and 209. This enables more efficient delivery via a Content Delivery Network 203. The video origin server 210 generates the one or more personalized media segments 208, 209 based on the original, inserted or edited content 211 received from an audio/video source 212 for delivery to the client 201. The video URL resolver 207 resolves the one or more encoded URLs adhering to the structure of source and output descriptor 244 based on the one or more personalized media segments 208 and 209. The manifest generator 205 generates the one or more personalized manifest files 204 containing the one or more encoded URLs adhering to the structure of source and output descriptor 244. The video origin server 210 is linked to the content delivery network 203 to deliver the one or more personalized media segments 209 and 208 to the client 201.

The system 200 introduces unique components that enable improved caching within normal Content Delivery Network of personalized media streams. For example, the URL resolver 207 and the compositor 218 generate and resolve content based URLS for the content. In one embodiment, the compositor 218 is linked between the CDN 103 and the video origin server 210 to convert the one or more encoded URLs adhering to the structure of source and output descriptor 904 to the one or more personalized segments 208, 209. These URLs can be used as a cache key 216 in the Content Delivery Network 103 (CDN). For example, the content delivery network CDN 103 uses the one or more encoded URLs adhering to the structure of source and output descriptor 244 as a cache key 216 for caching the original, inserted or edited content.

These components solve some of the problems related to delivering highly personalized and converted presentations. It is suitable for delivering converted content with improved caching for delivering to a client 101, which can be any device that can playback a media presentation such as a TV, a smart phone a set-top box, a tablet, a computer or any other terminal capable of receiving and playing back a media presentation. Compared to the state of the art specified in the Unified Remix system of system 100 for streaming of personalized media content, the system 200 introduces the distinguishing components such as compositor 218 (also called a Unified Compositor) and a URL resolver 207 to enable improved generation of URLs for caching and delivery within the Content Delivery Network 203. Further the disclosed invention can be applied to any converted or personalized content, not only personalized content generated using the Unified Remix System.

Portions of the system 200 can incorporate components, or be designed, in accordance with the system components described in U.S. patent application Ser. No. 15/598,360 filed May 18, 2017, entitled Delivery of Edited or Inserted Media Streaming Content", now issued U.S. Pat. No. 9,936,229 by the same inventors, and hereby incorporated in entirety by reference.

The media presentations with edited or inserted or original converted content 102 are delivered to the client 101 in a known format such as Apple HLS or MPEG DASH. However the streaming manifest 204 which could be a DASH mpd manifest or an HLS m3u8 manifest containing URLS adhering to the structure of source and output descriptor 244 which is specific to this advanced streaming system. Based on these URLS, the one or more personalized media segments 208,209 can be requested by the client 101 and or the CDN 103 using an HTTP request. The content delivery network 203, which can be based on a commercial content delivery such as Amazon Cloudfront™ or Akamai™, or any other network using proxy cache functionalities for temporarily storing the one or more personalized media segments 208, 209 can be used to improve the delivery by providing this caching and delivery layer. The content delivery network 203 uses the cache content key 216 to identify cached items based on the request URL, which disclosed herein, can be based on the encoded URLs adhering to the structure of source and output descriptor 244. The video origin 210 which can be based on Unified Origin or any other video origin server that provides functionality for streaming such as on-the-fly encryption, multiple streaming protocol support and such functionalities. Examples of such other video origin servers are provided by other vendors such Amazon Elemental, Microsoft, Ericsson or Harmonic.

The video origin 210 also performs the packaging generating the personalized media segments 208, 209, which can be segments based on known formats such as MPEG-2 TS, ISOBMFF, Common Media application format and/or fragmented ISOBMFF using formats used in streaming protocols like Apple HLS or MPEG DASH, Microsoft smooth streaming. The one or more personalized media segments 208 are resolved by the video URL resolver 207 to be mapped to URLs adhering to the source and output descriptor 244 (shown as 600 in FIG. 6) or encoded URLs adhering to the source and output descriptor 244 (shown as 600 in FIG. 6).

The Manifest generator 205 can then generate manifests using these 244, hence a manifest for Apple HLS m3u8 500 can have URLs based on the structure adhering to source and output descriptor 244 (shown as 600 in FIG. 6) or encoded URLs adhering to the structure of source and output descriptor 244. In some implementations the manifest generator 205, video origin 210 and manifest generator can be implemented as a single monolithic entity. In other cases these components could be implemented using a microservice architecture such as using Docker and/or Kubernetes, composing an application of different independently running blocks. Another component is the unified compositor which can also be embedded in a single monolithic entity with the video origin 210, video URL resolver 207, manifest generator 205, or alternatively in a microservice architecture as a separate component running as a container or virtual machine. This compositor 218 is responsible to convert back the encoded URLs adhering to the source and output descriptor to the request URLs of the one or more personalized media segments 208,209.

Figure 2B:
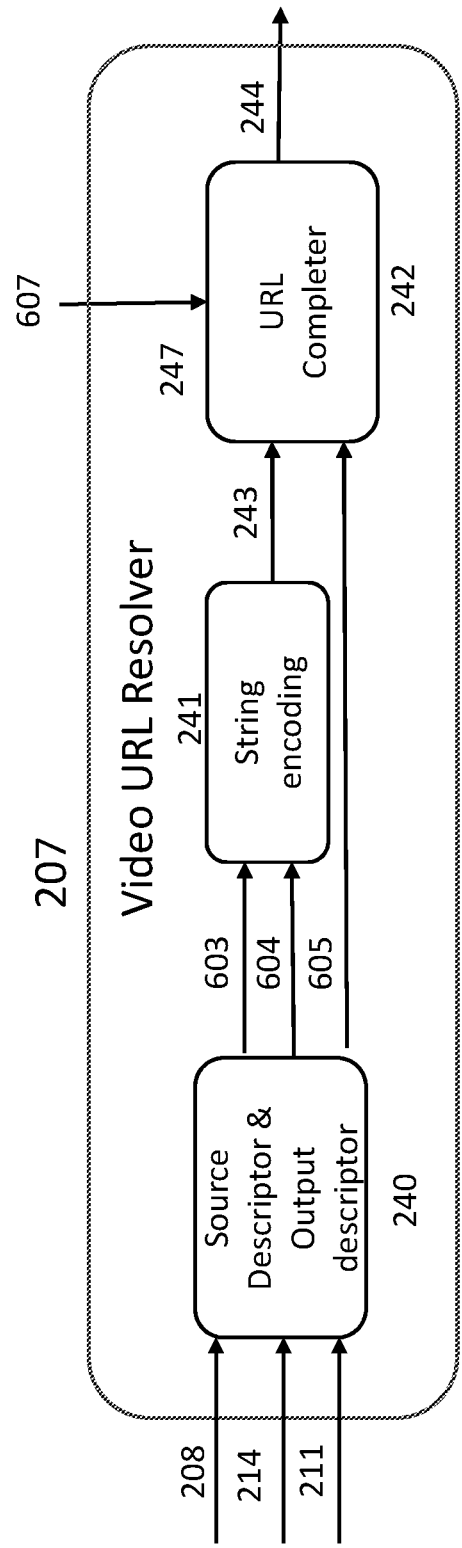
FIG. 2B illustrates a means by which the system of FIG. 2 can encode and compose the URLs adhering to the structure of source and output descriptor.

Briefly, FIG. 2B illustrates an exemplary means by which the system of FIG. 2A can encode and compose the URLs adhering to the structure of source and output descriptor 244. The URLs adhering to the structure of source and output descriptor 244 (shown as 600 in FIG. 6) are encoded using a string encoding techniques such as base64 encoding to obtain the encoded URLs adhering to the structure of source and output descriptor. The encoding can be achieved by the string encoding component 241 which can be a processor or other computing device within the system of FIG. 2A, or for instance, a component in the system 800 of FIG. 8. Examples of string encoding include base64 encoding and many other possibilities of character and string encoding. The main aim of encoding the string is to make the URL shorter and uniquely decodable. The encoder output the encoded part of the URL corresponding to the encoded source descriptor and output descriptor. The one or more personalized media segments 208, the MPEG-4 metadata 214 and a reference 211 to the AV sources 212 are used to generate the source descriptor 604 and the output descriptor 603 based on boxes in the ISOBMFF as specified by the Moving picture experts group as shown in FIG. 7A and FIG. 7B. As both the MPEG-4 metadata 214 which relates to the output description and the AV sources 212 are based on ISOBMFF containing all the boxes necessary to generate the source descriptor to the AV sources 212, they can be used to generate the source and output description 603, 604 as illustrated in FIG. 7A and FIG. 7B.

These two descriptors: the source descriptor 604 and output descriptor 603 are coded using a string encoding 241 that could be based on base64 encoding in some embodiments. The playout format extension 605 such as .ismv, .ts or .mpd and the base URL 607 pointing can be appended to produce the full encoded URL adhering to the structure of source and output descriptor 600. The said URL is content dependent and can be used for requesting converted content with improved caching by the player/client 101. The said URL can be used to request the virtualized content URL.

The input of the string encoder 241 is the part of the URL 604 which corresponds to the source descriptor, the output descriptor 603 and the playout format 246, but other constructs of the URL are not precluded, outputting the encoded part for the URL 243 which can be completed by way of the URL completer 242 to the encoded URL adhering to the structure of source and output descriptor 244.

Returning back to the description of FIG. 2A, the resulting one or more personalized manifests 204 from the manifest generator 205 can then be send to the content delivery network CDN 103. The conversion backend 215 can for example be based on unified remix and perform a stitching of contents such as the inserted, edited or original content 212 simply referred as a/v content in FIG. 2. Alternatively the conversion backend 215 could be a cloud transcoder or other type of processing and conversion platform such as the one envisioned in MPEG Network based media processing. The conversion backend 214 can produce a meta-data file, dref MPEG-4 file 213 that contains reference to the samples of the target media presentation and other meta-data and sample references guaranteeing a continuous timeline. This MPEG-4 meta-data 217 file can be used by the video origin 210 to generate the one or more personalized media segments 208,209.

The video origin 210 is configured to generate a media presentation for different streaming protocols such as MPEG-DASH or HTTP Live Streaming HLS that is ultimately presented to the client 101, possibly through a content delivery network. In addition, the video origin server 210 can optionally add content protection based on a Digital Rights Management solution (DRM) protecting the media presentation that is finally delivered to the client 101 through a content delivery network (CDN) 103. The client 101 can be a website rendered at a mobile device, personal computer, a TV or any other device or entity capable of rendering a media stream such as a set-top box, a television, a laptop, a computer or a tablet or mobile device.

In a preferred embodiment the video origin 210 is based on current or future version of the Unified Origin video streaming server provided by the Unified Streaming platform, yet other video origins that provide similar functionalities could also be used, functionality including but not limited to on-the-fly packaging of media content, Digital rights management and manifest generation. The manifest generator 205 and the video URL resolver 207 are components that together generate the manifests with encoded URL's adhering to the structure of source and output descriptor 244. The compositor 218 or origin server 210 then can resolve them to actual media segments respectively when requests for the one or more personalized media segments are received. These components can be implemented as separate entities of servers or embedded in the computational unit of the video origin 210. The Content Delivery Network 203 can be any type of content delivery network comprising one or more cache proxies, such as based on Varnish, Nginx or based on commercial solution like Amazon CloudFront or Akamai or any other commercial content delivery network. The Video URL Resolver 207 can be placed either at a separate location resolving the one of more URLs generated as a server component, or in some embodiments this component could be integrated with the video origin 210 in practical deployments. The a/v sources 212 can be any media stored as MPEG-4 files or in other media formats such as raw AVC/H.264, HEVC/H.265, Matroska MPEG-2 transport stream or any other compression or container format for storing media data. The a/v sources in 212 contain the original, inserted and edited content stored on different locations such as on cloud storage, dedicated storage or hosted on other storage or server hosting solutions.

The a/v sources 212 containing the inserted, edited and original media 212 can be done at servers running on dedicated hardware or on a public cloud based on object storage such as Amazon S3 or OpenStack Swift. The audio video sources can be stored on a disk or obtained from a camera and or live encoder. In each of these cases these sources comprise the original, inserted and edited content 212 used later in the system for generating the personalized media segments 208, 209 and streaming manifests 204.

Figure 3:
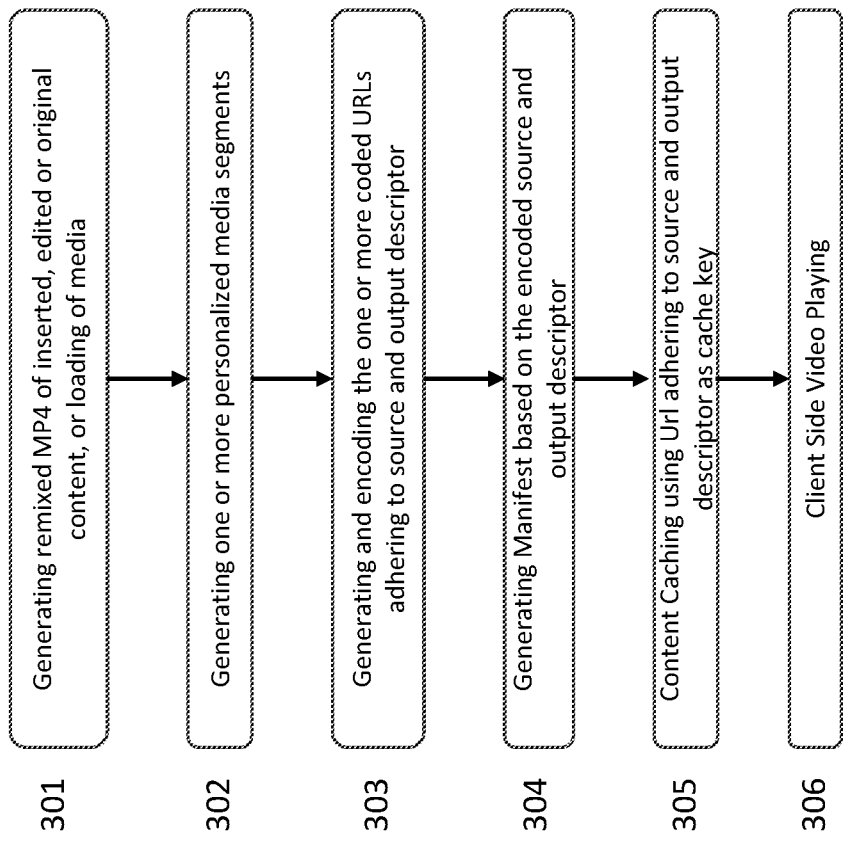
FIG. 3 illustrates a method for improved caching and delivery of converted media streaming content.

FIG. 3. illustrates a method 300 for streaming between a server and a client with original, edited or inserted media content in real-time. The method 300 can be practiced with more or less than the number of steps shown. To describe the method 300, reference will be made to other figures although it is understood that the method 300 can be implemented in any other suitable device or system using other suitable components. Moreover, the method 300 is not limited to the order in which the steps are listed or to the components discussed. In addition, the method 300 can contain a greater or a fewer number of steps than those shown.

At step 301, the conversion backend 215 generates a personalized MPEG-4 metadata file 213 that references the original, edited or inserted media content 212. It can do this based on the format described in the ISOBMFF by the moving picture experts group MPEG, as published as an international standard by the ISO/IEC. In case the ISOBMFF is used as MPEG-4 metadata 214, file, it does not contain the media data box mdat and the dref box 762 references the location of the sources. Instead of generating a personalized MPEG-4 metadata file instead the inserted, edited or original content 212 can be loaded directly by the conversion backend 215 in some simple cases. In one arrangement the source descriptor contains the dref box ISOBMFF box for resolving to the location of the original, inserted or edited media content. The source descriptor also uses ISO Base Media File Format boxes 700 for describing the source content in the source descriptor 750 and performing byte range or time range access to the media referenced in the dref box 712. In a preferred embodiment the URLs adhering to the source and output descriptor are encoded using base 64 encryption. In another arrangement, the one or more encoded URLs adhering to the source and output descriptor 600 contain the dref 762 to refer to a location of the original, inserted or edited contents 212.

At step 302, Video Origin 210 generates the one or more personalized media segments 208/209, based on the MPEG-4 metadata file 214 and the inserted, edited or original content 212. Alternatively other packaging methods could be used that generate media segments as described in the MPEG DASH and Common Media Application format specification developed by the Moving Picture Experts Group or as in the HTTP live streaming RFC 8216. Generating the one or more personalized media segments 208/209 can generate any type of media segments that can be consumed by a client 101 and content delivery network 103 for delivery and playback of media presentations. Another example of the one or more personalized media segments 208/209 could be based the fragmented MPEG-4 format used in the Microsoft Smooth Streaming specification.

At step 303, Video URL Resolver 207 generates the one or more coded URLs adhering to the source and output descriptor 244. In this step, the Video URL Resolver 207 combines the inserted, edited or original content 212 and the MPEG-4 metadata 213 and the one or more personalized media segments 208,209 to generate a text string adhering the structure of source and output descriptor 600. The Video URL Resolver 207 generates the source descriptor 750 based on the MPEG-4 metadata ISOBMFF boxes and time ranges in the boxes of the MPEG-4 metadata 214 or directly on the metadata boxes of the inserted, edited and original content 212 when it is stored in the ISOBMFF file format. The source descriptor 750 is created by combining the boxes, while the output descriptor 702 based on the format based on the ISOBMFF boxes and the output descriptor based on the boxes in the one or more personalized media segments 208/209. This combination of boxes typically includes the boxes as shown in 700 but not limited to that, typically the generation of the URLs adhering to the source and output descriptor 600 can comprise any of the boxes in the moov ftyp or other boxes specified in the ISOBMFF.

Figure 6:
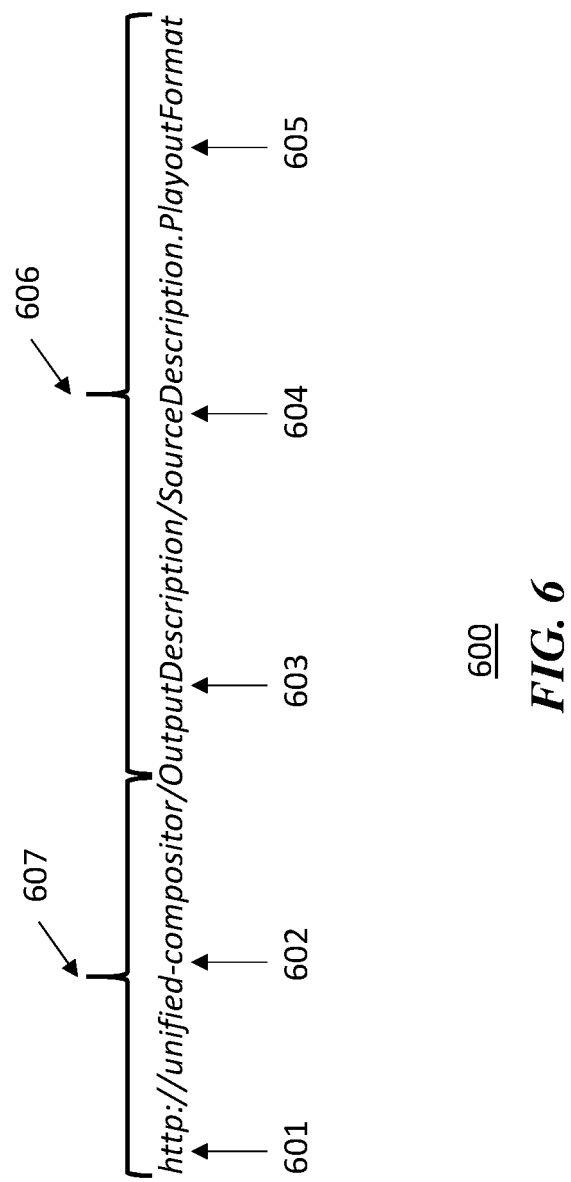
FIG. 6 illustrates a structure of the URLs adhering to the structure of source and output descriptor in accordance with one embodiment.

At step 304, the manifest generator 205 generates the manifest 204 based on the encoded source and output descriptor from the previous step. The manifest generator 205 uses the encoded URLs that adhere to source and output descriptor 244 as segment URLs to produce manifests 307 that contain URL segment links, which are encoded URLs adhering to the structure of source 604 and output descriptor 603 structure. The structure of these URLs is illustrated in FIG. 6. and labeled 600. These URLs can be used as the manifest such as the DASH .mpd or the HLS m3u8 file. The server side generates the manifest with encoded URL's adhering to the structure of encoded source and output descriptor 244 that can be used for caching in the CDN 103.

At step 305, a proxy server with a cache, or other coupled device, caches the URLs to distinguish different segments. The segment links are the encoded URL's adhering to the structure of source and output descriptor 244 that provides the same identifier for similar converted content. The proxy server can also store the one or more original, inserted or edited media contents 212 using the one or more URLs adhering to the structure of source and output descriptor 600.

At step 306, the CDN 103 delivers the one or more personalized media segments from the cache to the client/player 101, for example, using the cache key 216. Recall, it is the client 101 that requested segments based on the encoded URLs adhering to structure of source and output descriptor 244. The method 300 can end at this point, and/or provide continued support in requesting and caching converted media streaming content to the client 101.

Figure 4:
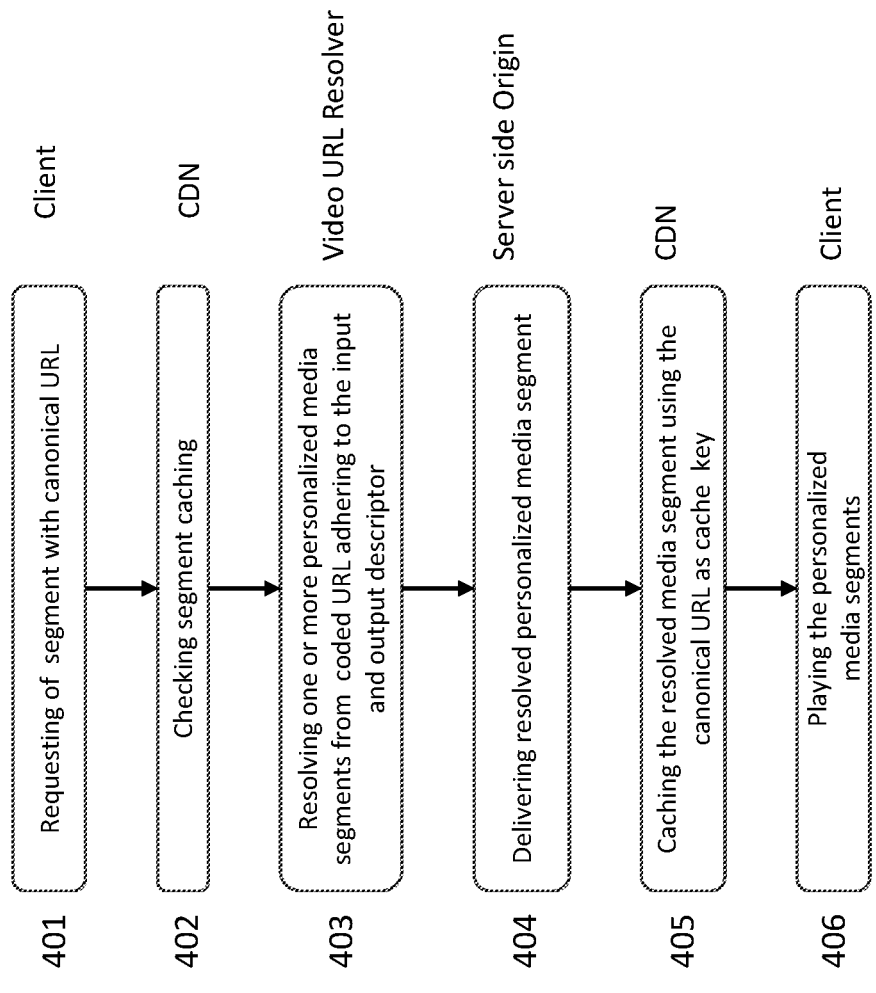
FIG. 4 illustrates a sequence diagram of the disclosed method of FIG. 3 for streaming media between a client and server and by way of intermediate components.

FIG. 4. illustrates a method 400 for streaming between a server and a client with original, edited or inserted media content in real-time. The method 400 can be practiced with more or less than the number of steps shown. To describe the method 400, reference will be made to other figures although it is understood that the method 400 can be implemented in any other suitable device or system using other suitable components. Moreover, the method 400 is not limited to the order in which the steps are listed in the method 400. In addition, the method 300 can contain a greater or a fewer number of steps than those shown.

The method 400 can start in a state where the client 101 requests one or more personalized media segments 209, 208 using a request URL. At step 401, the client 101 requests a segment based on the encoded URL adhering to the structure of source and output descriptor 244. Typically the client 101 wishing to playback the personalized media presentation, issues a HTTP request through the CDN 103. At step 402, the CDN 103 checks segment caching using the cache key 403, which is based on the encoded URL, and based on source and output descriptor 244. If it is not present, the CDN 203 forwards the HTTP GET request for compositing the media segment URL from the encoded URL adhering to source and output descriptor 244. At step 403, the Video URL resolver 207 resolves the one or more personalized media segments 208/209 from coded URL adhering to the input and output descriptor 244. Specifically, the request URL from the client will be resolved in the content delivery network 203 and will adhere to the structure of encoded source and output descriptor 244. At step 404, the server side video origin 210 delivers the one or more personalized media segments 208/209 to the CDN 203. At step 405, the CDN 103 caches the one or more personalized media segments 208/209. Thereafter at step 406, the client 101 plays the one or more personalized media segments 208/209 to the client 101. The main innovation disclosed in this method consists of indexing the one or more personalized media segments coded by the system 200 is based on the source and desired output of a media processing operation that can be performed in the cloud or in the network itself.

FIG. 5. illustrates two streaming manifests 500, one based on the HTTP Live Streaming format 501 and a second based on the MPEG Dynamic adaptive streaming format 502. Briefly, the client 101 uses the one or more encoded URLs adhering to the structure of source and output descriptor 244 from the one or more personalized streaming manifests 204 to request the one or more personalized media segment 208,209. The output of the video origin 210 results in personalized playlist describing the one or more personalized media segments 208,209, resulting in unique user defined manifest files that points to different URL's that can be resolved by the unified compositor 218 to the one or more personalized media segments 208, 209, which in each case can be resolved by the Video Origin Server 210. These encoded URLs adhering to the source and output descriptor 244 make it easy to cache content in Content Delivery Networks that are typically used to scale video streaming. This figure shows how the URLs are embedded in the streaming manifest 204 that can be for HTTP Live Streaming or for MPEG DASH. The method taught uses URLs that can be cached more efficiently in content delivery networks as the encoded URLs adhering to the source and output descriptor are related to the actual inserted, edited or original media contents 212 and can be used as a distinguishable cache key 216. In this case a manifest is generated by the manifest generator 207 in which the one or more personalized media segments URL's are replaced with encoded URLS adhering to the structure of source and output descriptor 244 enabling the content dependent caching.

FIG. 6. illustrates a structure of the URL 600 that adheres to the structure of source and output descriptors 244 (see FIG. 2A) disclosed herein, the URL 600 adhering to the structure of source and output descriptor 244 comprises an output descriptor 603, 702 and a source descriptor 604, 750 and playout extension format 605 (.ts for HLS, .ismv for smooth etc.). These URL's will create both unique content based identification of the video segment that enables identical URL's for identical content. The implementation of the encoded URL adhering to structure of source and output descriptor comprises a source descriptor 604 and output descriptor 603 as disclosed herein formatted as a small ISO Base Media File Format data, possibly coded in a character encoding such as base 64 and concatenated in a valid URL [RFC 3896]. In other embodiments herein, the URL can be build using other media data container such as based on Matroska, however the ISOBMFF format for media is the most used format and the most desirable format, and this format is used in preferred embodiments herein. The URL adhering to structure of source and output descriptor can be encoded using string encoding method such as base64 encoding or other encodings applied to the source descriptor 604 and output descriptor 605 part of the URL strings.

The URL also contains the access scheme 601 which is commonly based on the Hyper text transfer protocol (http://) or hyper text transfer protocol over TLS (HTTPS). For video streaming the hostname of the compositor is specified 602, the compositor can be part of the video origin 210 as shown in FIG. 2, or deployed as a proxy between the video origin 210 and the CDN 103 as shown in FIG. 1. The hostname to the compositor 602 may be the same as the hostname of the video origin server. The compositor 218 is responsible to resolving back the URLS based on encoded source and output descriptor to the actual media segments initially generated internally by the video server origin. The playout format 605 specifies the output playout format of the segment (e.g. .ismv for smooth streaming, .ts for segments in HLS, .mp4 for MPEG DASH). The access/protocol identifier 601 is typically Hyper Text Transfer Protocol (HTTP) or HyperText Transport Protocol over TLS (HTTPS)

FIG. 7. illustrates the structure of the source and output descriptor that follows the hierarchical structure with box and atom types as defined in ISO base media file format, the output descriptor 702,603 describes the format of the media segment eventually delivered to the client, while the source descriptor 750,604 describes the source media used to generate the segment, these are the audio video (a/v) sources 212 comprising the original, edited and inserted media content 212 typically based on the MPEG-4 metadata 214 that contains the same ISOBMFF boxes such as the movie box 704 but not the actual media samples in an mdat box. The source descriptor and output descriptor can be character encoded such as using a base64 or any other character encoding scheme to compose the text string as a compliant URL as defined in [RFC 3896]. The output descriptor 702 603 comprises the following boxes as defined in the ISO Base Media file format: ftyp 703, moov 704, trak 705, mdia 706 hdlr 707, mdhd 708, minf 709, stsd 710, sinf 711, frma 712, schm 713, schi 714, tenc 715, moof 716, mfhd 717, traf 718, tfhd 719, tfdt 720. The ftyp box 703 is used to assign the brand of the outputted media segment, the mediaheader box (mdhd) 708 or media fragment header mfhd 753 can be used to signal the timescale of the video. The boxes are used as defined in the ISOBMFF file format, and if omitted the same time scale as in the source descriptor can be used. The sample description box stsd 710 can be used to signal if a different fourcc code is used when compared to the source descriptor. Other boxes can also be used to composite/output the segment. The source descriptor 750 is used to describe the source on storage or disk that is used to generate the media segment, it comprises the ftyp box 751, the moof box (if available in the source), the movie fragment header mfhd 753, track fragment header (traf), metabox meta 759 is used to build up sample information, and the dref box which is used to located the source mp4, in this case http://example-.com/video.mp4, and then the Item Location, iloc box can be used to signal how the item is referenced, either time based or byte based. For time based a tfxd box will be present, when byte based access is used the extend boxes have to be present (recommended), but sometimes time based access is preferable. For byte ranges the extent fields extent_count 766 extent_offset, extent_length 767 can be used to signal the ranges. By these boxes and building the source descriptor 750 604 and output descriptor 702 603 as ISO Base media file format boxes a content dependent URL is constructed adhering to the source and output descriptor. These URLs adhering to the output descriptor and source descriptor are then used in the one or more manifests 501,502.

Where applicable, the present embodiments of the invention can be realized in hardware, software or a combination of hardware and software. Any kind of computer system or other apparatus adapted for carrying out the methods described herein are suitable. A typical combination of hardware and software can be a streaming device with a computer program that, when being loaded and executed, can control the streaming device such that it carries out the methods described herein. Portions of the present method and system may also be embedded in a computer program product, which comprises all the features enabling the implementation of the methods described herein and which when loaded in a computer system, is able to carry out these methods.

For example, FIG. 8 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

A computing architecture of the computer system 600 to can includes a client 201 with playback 801, client input 803 bundled in the client, an exchange of messages 810, the system and method would run on a processor 802 based on instructions 807 that are stored in main memory 804 or in the processor cache 802, further instructions can be stored on persistent memory 806. The exchange of information uses a network interface device 816 and a Network 808 and possibly a database 818. The message and data exchange 810 is connected to the audio and video storage 212 and to computer readable medium 820. The server 852 refers to the manifest generator 205, the video URL resolver 207 or the video origin 210.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, C++, C#, VB.NET, Python, Vala, GEM, or the like, conventional procedural programming languages, such as the "C" programming language, Visual Basic, Fortran 2003, Perl, PHP, dynamic programming languages such as Python and Ruby or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS) and Security as a Service (SECaas). Further, the use of virtualization techniques such as using hypervisors based virtualization or operating system level virtualization to implement the proposed schemes is not precluded.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed, is:

1. A computing architecture system for delivery and caching of media presentations, the system comprising:
    a video origin server executing instructions in a processor from a memory thereto coupled to generate one or more personalized media segments based on an original, inserted or edited content for delivery to a client;
    a video Uniform Resource Locator (URL) resolver executing instructions in the processor from the memory to resolve one or more encoded URLs adhering to a structure of a source descriptor and an output descriptor based on the one or more personalized media segments; and
    a manifest generator executing instructions in the processor from the memory to generate one or more personalized manifest files containing the one or more encoded URLs adhering to the structure of the source descriptor and the output descriptor;
    where the structure of the source descriptor is based on character encoding of an ISOBMFF moov box;
    where the structure of the output descriptor is based on character encoding of an ISOBMFF moov box;
    where the one or more encoded URLs adhering to the structure of the source descriptor and the output descriptor are used as a cache key for caching or storing the personalized media segments;
    and where the video origin server is linked to a content delivery network (CDN) to deliver the one or more personalized media segments to the client.

2. The computing architecture system of claim 1, where the CDN uses the one or more encoded URLs adhering to the structure of the source descriptor and the output descriptor as the cache key for caching the original, inserted or edited content.

3. The computing architecture system of claim 1, where the client requests the one or more personalized media segments using a request URL which is resolved in the content delivery network to the request URL adhering to the structure of encoded source descriptor and encoded output descriptor.

4. The computing architecture system of claim 1, further comprising storing the one or more original, inserted or edited media contents using the one or more URLs adhering to the structure of the source descriptor and output descriptor.

5. The computing architecture system of claim 1, further comprising a compositor executing instructions in a processor from memory thereto coupled that is linked between the CDN and the video origin server to convert the one or more original, inserted or edited media contents by way of the one or more encoded URLs adhering to the structure of the source descriptor and the output descriptor to the one or more personalized media segments.

6. The computing architecture system of claim 1, where the one or more encoded URLs adhering to the source descriptor and the output descriptor contain the dref to refer to a location of the original, inserted or edited contents.

7. The computing architecture system of claim 6, where a source descriptor uses other additional ISO Base Media File Format boxes to describe a source content in the source descriptor, such as FileTypeBox (ftyp).

8. The computing architecture system of claim 6, where the client uses the one or more encoded URLs adhering to the structure of the source descriptor and the output descriptor from the one or more personalized streaming manifests to request the one or more personalized media segments.

9. The computing architecture system of claim 6, were the content delivery network delivers the one or more personalized media segments to the client responding to an Hyper Text Transfer Protocol (HTTP) request based on the one or more encoded URLs adhering to structure of source and output descriptor.

10. A method, implemented by way of at least one processor executing instructions within at least one memory of a computing architecture system, for delivering and caching media presentations with inserted or edited media content to a client, the method comprising:
by way of a video origin server executing instructions in a processor from a memory thereto coupled:
    generating a MPEG-4 meta-data file that references an original, inserted or edited media content;
    generating one or more personalized media segments based on the original, inserted or edited media content;
by way of a Video Uniform Resource Locator (URL) resolver executing instructions in the processor from the memory:
    generating one or more encoded URLs adhering to a structure of a source descriptor and an output descriptor;
    where the structure of the source descriptor is based on character encoding of an ISOBMFF moov box;
    where the structure of the output descriptor is based on character encoding of an ISOBMFF moov box;

by way of a manifest generator executing instructions in the processor from the memory:
    generating one or more streaming manifests including the one or more encoded URLs adhering to the structure of the source descriptor and the output descriptor;
by way of the client:
    caching of content based on the one or more encoded URL's adhering to the structure of source and output descriptor;
    requesting the one or more personalized media segments using the one or more coded URL's adhering to the structure of input and output descriptor;
    using the one or more coded URL's adhering to the structure of the source descriptor and the output descriptor as a cache key for storing and delivery of personalized media segments; and
    delivering the one or more personalized media segments following a request using the one or more coded URL's adhering to the structure of input and output descriptor.

11. The method of claim 10, further comprising receiving and playing the one or more streaming manifests and the one or more personalized media segments at the client by way of the manifest generator.

12. The method of claim 10, further comprising segment caching using a cache key based on the one or more encoded URLs adhering to the structure of source and output descriptors by way of the CDN.

13. The method of claim 10, further comprising the one or more encoded URLs adhering to the structure of source and output descriptor using a source descriptor and an output descriptor based on ISO Base media file format data boxes.

14. The method of claim 10, further comprising resolving encoded URLs adhering the structure of source and output descriptor back to the personalized media segment by way of the Video Uniform Resource Locator (URL) resolver.

15. The method of 10, where the source descriptor contains a dref box for resolving a location of the original, inserted or edited media content.

16. The method of 15, where source descriptor uses other additional ISO Base media file format boxes for describing a source content in the source descriptor.

17. The method of 16 further comprising performing byte range or time range access to the media referenced in the dref box.

18. The method of 15, where output descriptor uses ISO Base media file format boxes for the source descriptor and output descriptor of the one or more encoded URLS adhering the structure of source and output descriptor.

19. The method of 10 which further comprises encoding URLs adhering to source and output descriptor using base64 encryption to encode URLs adhering to the source and output descriptor.

20. The method of claim 10,
    where the one or more personalized segments are converted from the original, inserted or edited media content using the MPEG-4 meta-data;
    where the encoded URLs adhering to the structure of source and output descriptors are generated based on the remixed MPEG-4 meta-data and the original, edited and inserted content and the target output descriptor; and
    where delivering of the one or more personalized media segments occurs subsequent to HTTP requests using the encoded URLs adhering to the structure of source and output descriptors.

* * * * *